United States Patent [19]

Carsello

[11] Patent Number: 5,566,213
[45] Date of Patent: Oct. 15, 1996

[54] SELECTIVE CALL RECEIVING DEVICE WITH IMPROVED SYMBOL DECODING AND AUTOMATIC FREQUENCY CONTROL

[75] Inventor: Stephen R. Carsello, Boynton Beach, Fla.

[73] Assignee: Motorola, Inc., Schaumburg, Ill.

[21] Appl. No.: 401,467

[22] Filed: Mar. 9, 1995

[51] Int. Cl.$^6$ .................. H03L 7/00; H04L 7/00; H04B 1/06

[52] U.S. Cl. .................. 375/344; 375/340; 375/345

[58] Field of Search .................. 375/344, 345, 375/340, 368, 316

[56] References Cited

U.S. PATENT DOCUMENTS

| | | | |
|---|---|---|---|
| 4,455,663 | 6/1984 | Ragsdale | 375/345 |
| 4,627,079 | 12/1986 | Von Der Embse | 375/345 |
| 4,669,094 | 5/1987 | Van Rumpt | 375/344 |
| 5,025,251 | 6/1991 | Mittel et al. | 375/317 |
| 5,040,194 | 8/1991 | Tjahjadi et al. | 375/345 |
| 5,311,554 | 5/1994 | Morera et al. | 375/316 |
| 5,406,587 | 5/1995 | Horwitz et al. | 375/344 |

OTHER PUBLICATIONS

NASA's Jet Propulsion Laboratory, "Decision–Directed Automatic Gain Control," NASA Tech Briefs, vol. 4, No. 1, p. 10.

Primary Examiner—Stephen Chin
Assistant Examiner—Jeffrey W. Gluck
Attorney, Agent, or Firm—Keith A. Chanroo

[57] ABSTRACT

A selective call receiving device (10) includes a signal decoder that utilizes both a peak and valley routine and a stochastic gradient feedback route for processing a received signal. The peak and valley routine is operable prior to the detection of a predetermined synchronization word in the received signal to detect the peak and valley of a received signal and to generated based on detected peak and valley, a DC offset correction value for correcting the received signal prior to symbol decoding. A number of threshold values are also generated based on the detected peak and valley of the signal for use by a symbol decoder (77). The symbol decoder (77) utilizes the threshold values for decoding a signal into symbols. The symbol decoder (77) also generates a feedback error that is used after the detection of the predetermined synchronization word for updating the DC correction value and for generating a gain correction value. An automatic frequency control signal is generated based on the DC correction value and a signal quality metric derived from the feedback error.

43 Claims, 7 Drawing Sheets

SELECTIVE CALL RECEIVING DEVICE WITH IMPROVED SYMBOL DECODING AND AUTOMATIC FREQUENCY CONTROL

FIELD OF THE INVENTION

The present invention relates to a selective call receiving device such as a pager and more particularly to such a device that utilizes a combination of a peak and valley routine and a stochastic gradient symbol recovery routine for decoding a received signal and that further utilizes a D.C. correction term and signal quality metric resulting from the operation of these routines to very quickly provide an automatic frequency control signal that is very accurate.

BACKGROUND OF THE INVENTION

In selective call networks, such as a paging network, a sequence of digital symbols is modulated and sent from a transmitter to a receiver. The receiver performs the necessary signal processing functions to demodulate the signal and to decode the demodulated signal into digital symbols. In order to decode the received signal into digital symbols, the receiver must obtain timing and other synchronization information from the received signal upon which it can base its symbol decoding decisions. Once synchronization onto a given frame of a received signal has been achieved, a tracking element is utilized to adapt thresholds that are used for symbol decoding as well as for the timing recovery operation.

In known pagers utilizing such protocols as FLEX having a four-level structure with a 6400 bps frame, the output of an FM demodulator of the pager is sampled at a very high rate. Peak and valley techniques are applied to the sampled output of the demodulator in order to establish symbol detection thresholds. A zero-crossing phase-locked loop is utilized for acquiring and maintaining timing synchronization. During four-level data detection, however, the performance of the receiver is very sensitive to the quality of the symbol detection thresholds that are set by the peak and valley routine. Depending on the distribution of the data, the peak and valley search operation will result in sub-optimum detection thresholds so that on average performance degrades. Further, the phase-locked loop clock recovery system must run at a very high sampling rate and can experience timing phase jitter even in the presence of a strong received signal. This jitter typically occurs about the center of the zero-crossings of the waveform so that the loop does not necessarily lock onto the point of the sampled waveform where inter-symbol interference is minimum, this point being known as the point of maximum-eye-opening.

Stochastic gradient symbol recovery routines have been used in radios, but it has not been known to use these routines in selective call receiving devices such as a pager. A stochastic gradient symbol recovery routine or system will lock onto the maximum-eye-opening point with very little jitter and further requires only a few samples of the signal per symbol. However, stochastic gradient systems can experience false lock points during acquisition that render the system unusable. One method for acquiring initial acquisition for a stochastic gradient symbol recovery system is to use a signal correlator that correlates the raw received signal with an expected synchronization word waveform. This method, however, has severe falsing problems in the presence of noise.

SUMMARY OF THE INVENTION

In accordance with the present invention, the disadvantages of prior symbol decoding techniques utilized in known selective call receiving devices have been overcome. The selective call receiving device of the present invention includes a signal decoder method that combines a peak and valley routine and a stochastic gradient recovery routine in a manner that provides optimum synchronization acquisition and signal tracking. Further, a DC correction value and signal quality metric resulting from the peak and valley/stochastic gradient symbol recovery routines of the signal decoder are utilized to very quickly provide a very accurate automatic frequency control signal for the demodulator of the receiving device.

More particularly, the signal decoder and method of the selective call receiving device in accordance with the present invention decodes a signal received by the device wherein the received signal represents a number of symbols and at least one group of the symbols forms a predetermined synchronization word. The signal decoder includes a synchronization word detector for detecting the predetermined synchronization word in a received signal. Prior to the detection of the predetermined synchronization word, a peak and valley detector is operable for determining values representing the peak and the valley of the received signal. From the determined peak and valley values, a correction value is derived that is applied to the received signal for correcting the signal to compensate for offsets between the transmitter and receiver. The corrected signal is applied to a symbol decoder that utilizes threshold values based on the determined peak and valley values for decoding the signal into symbols. The symbol decoder also generates a feedback error that is associated with a decoded symbol and that is utilized by a stochastic gradient feedback loop system. A portion of the stochastic gradient feedback loop system is operable only after the detection of the predetermined synchronization word, for determining, in response to the feedback error one or more correction values to be used to correct the received signal for symbol decoding.

In accordance with another aspect of the invention, the selective call receiving device includes an accumulator for accumulating the feedback error over a predetermined portion of the received signal after the detection of the predetermined synchronization word. The accumulated feedback error is used to provide a signal quality value representing a measure of the quality of the received signal. The selective call receiving device also includes a frequency offset generator for generating a frequency offset value from one of the correction values that is determined by the stochastic gradient feedback loop system. The frequency offset value and the signal quality value are monitored by an automatic frequency control signal generator to very quickly provide a very accurate automatic frequency control signal.

These and other advantages and novel features of the present invention, as well as details of an illustrated embodiment thereof, will be more fully understood from the following description and drawings.

DESCRIPTION OF THE PREFERRED EMBODIMENT

Figure 1:
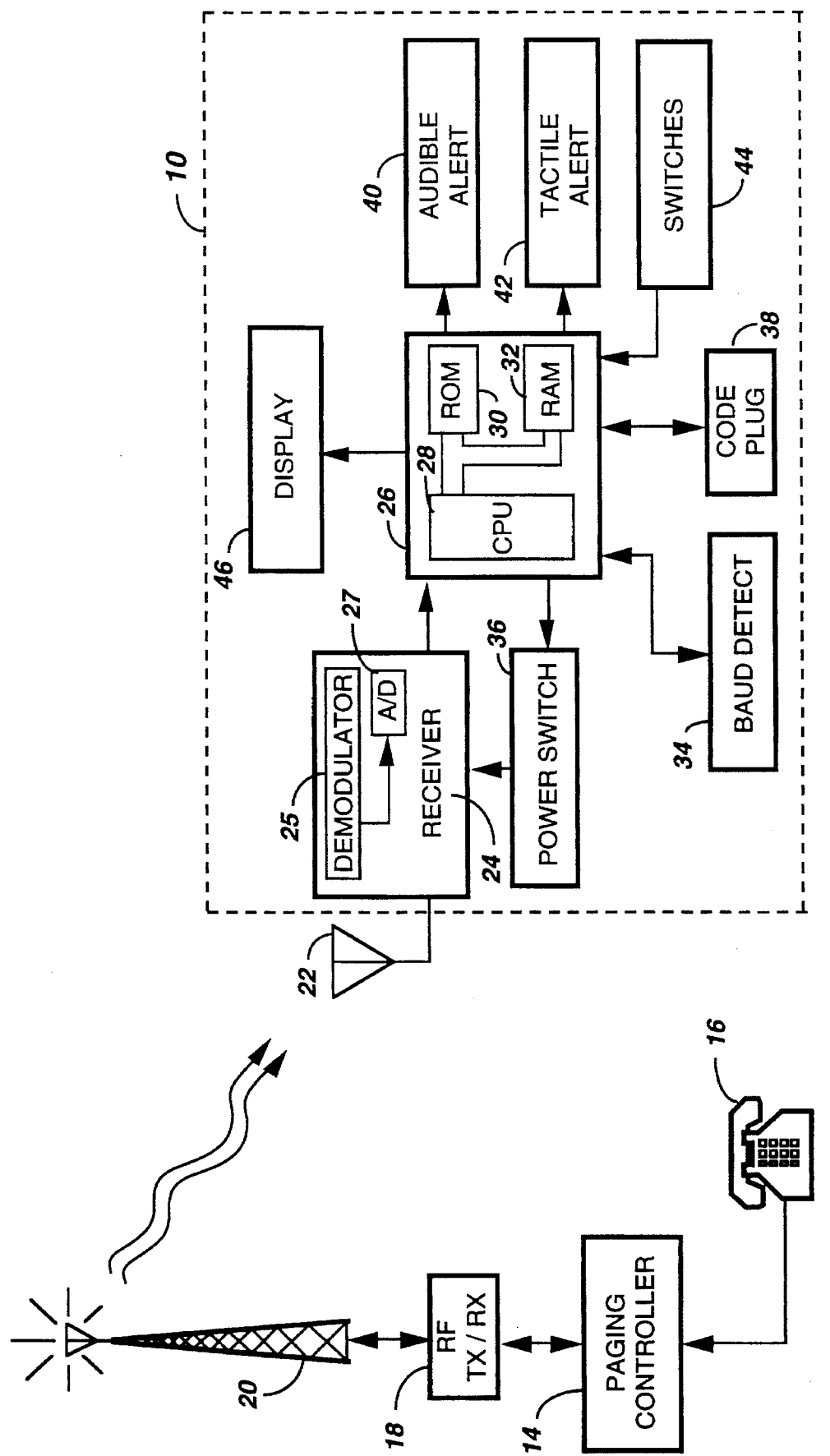
FIG. 1 is a block diagram of a selective call transmitting and receiving network illustrating in detail a selective call receiving device in accordance with the present invention.

A selective call receiving device 10 such as a pager is illustrated in FIG. 1 as receiving radio frequency (RF) signals from a paging network 12. The paging network 12 includes a paging controller 14 that receives input messages or page initiation messages from an input device such as a telephone 16. The paging controller 14 generates a paging message in accordance with a particular signaling protocol such as FLEX described in detail below. The paging message is coupled from the paging controller 14 to a RF transmitter/receiver 18. The RF transmitter/receiver 18 transmits the paging message via an antenna 20 for reception by a particular receiver 10 in accordance with an identification of the particular receiver 10 that is included in the paging message.

The selective call receiver 10 includes an antenna 22 for intercepting transmitted RF signals. The antenna couples the received signals to a receiver 24 that includes a demodulator 25 and an analog to digital convertor 27. The receiver 24 produces a data stream representative of a demodulated received signal that is coupled to a decoder/controller 26. The decoder/controller 26 includes a central processing unit (CPU) 28 for processing the demodulated signal information in accordance with software stored in a read only memory (ROM) 30 as discussed in detail below. A random access memory (RAM) 32 is utilized to store variables that are derived during processing and to store the decoded paging message information received by the selective call receiver 10. A baud detector 34 is coupled to the decoder/controller 26 in order to detect the baud rate of a received paging signal as is well known in the paging art. A power switch 36 is also coupled to the decoder/controller 26 in order to control the supply of power to the receiver 24 thereby providing a battery saving function.

The RF signals transmitted by the network 12 for paging applications, for example, typically include a receiver address that identifies a particular selective call receiver 10 as well as an associated alpha and/or numeric message. The decoder/controller 26 decodes a received address by comparing it with one or more addresses stored in a code plug or code memory 38. If the decoder/controller 26 detects a match between a received address and a stored address, an alert signal is generated to alert a user that a selective call message or page has been received by the device 10. The alert signal is directed to an audible alerting device 40 for generating an audible alert or to a tactile alerting device 42 for generating a silent vibrating alert. Switches 44 allow the user of the selected call receiving device 10 to, among other things, select between the audible alert 40 and the tactile alert 42 in a manner that is well known in the art. The switches 44 may also be operated by a user for causing a message stored in the RAM 32 to be accessed for display on a display 46. The switches 44 may also provide additional functions such as reset, read, delete, etc.

Figure 2:
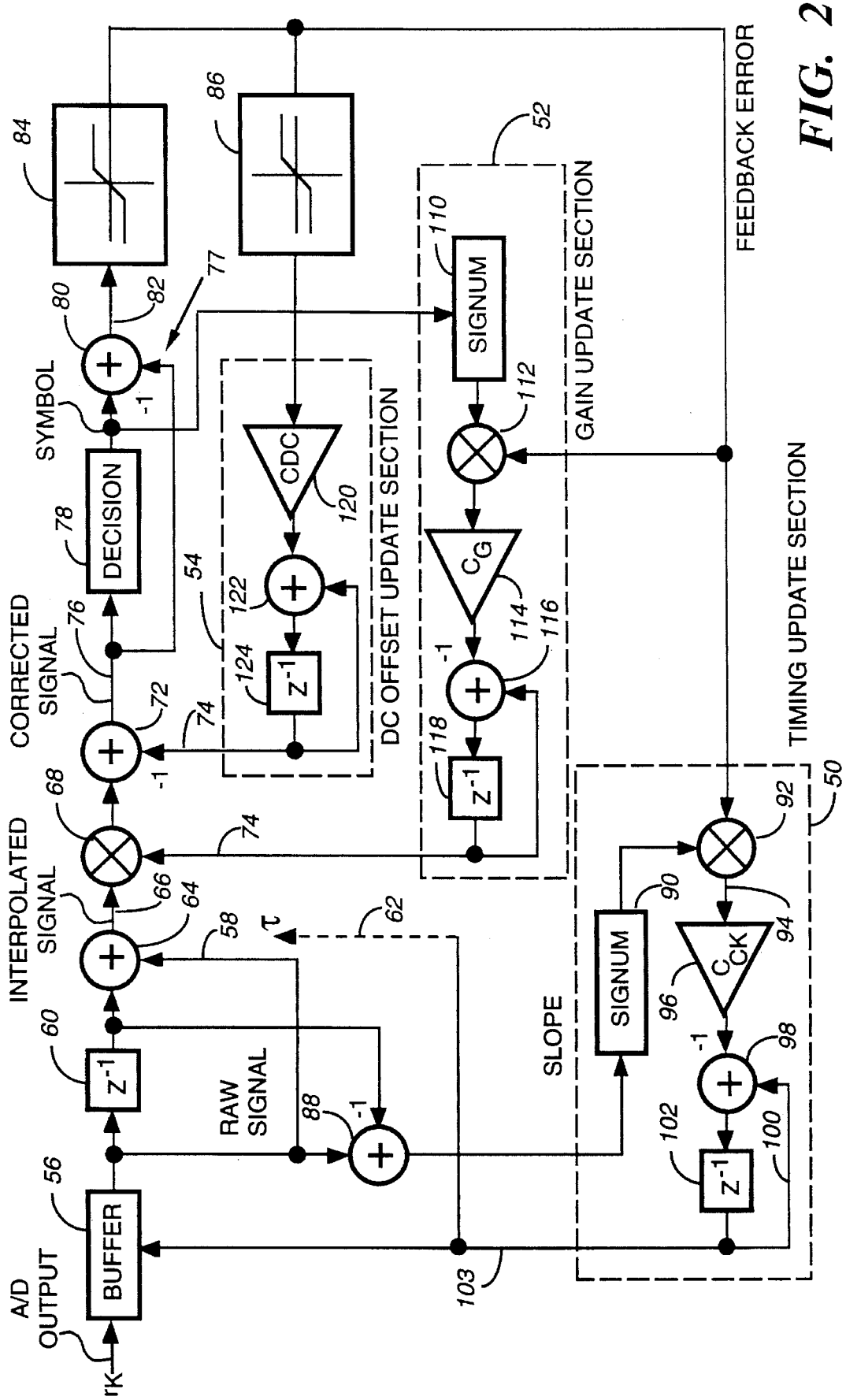
FIG. 2 is a block diagram of a stochastic gradient symbol recovery system or software routine utilized by the selective call receiver of FIG. 1.

FIG. 2 illustrates a stochastic gradient recovery system that is useable with a peak and valley routine as discussed in detail below with respect to FIG. 5A–C in order to provide optimum signal decoding. The system includes three sections, a timing update section 50, a gain update section 52 and a DC (Direct Current) offset update section 54. The timing update section 50 controls the timing of the processing the samples of a buffer 56 that stores a small number of samples, such as 24 samples, of the received, demodulated signal $r_k$ output from the analog to digital convertor 27 of the receiver 24. The timing update section 50 controls the sampling of the received signal in the buffer 56 so that the received signal is sampled at the maximum-eye-opening point. As will be apparent from FIGS. 5A–C, the timing update section 50 is operable with a peak and valley routine prior to the detection of a predetermined synchronization word contained in the received signal. After the detection of the predetermined synchronization word in the received signal, the DC offset update section 54 and gain update section 52 become operable with the timing update section 50 for the remainder of the signal decoding operation. The DC offset update section 54 provides a DC offset correction term or value that is used to correct the sampled, received signal in order to account for any frequency offset between the transmitter of the paging network 12 and the receiver 24. As will be apparent from the description of FIG. 6, the DC offset correction value is utilized to generate an automatic frequency control signal for the demodulator 25 of the receiver 24 as well as being used for symbol decoding. The gain update section 52 adjusts the signal values for four-level detection and accounts for variances in the FM deviation generated by the transmitter and receiver.

The stochastic gradient symbol recovery system depicted in FIG. 2 operates as follows. The buffer 56 samples are processed at a time determined by the timing update section 50 that seeks to lock onto the maximum-eye-opening point of the signal. The current sample applied on a line 58 and a previously stored sample output from a sample delay block 60 are utilized with an interpolating factor $\tau$ represented by the dotted line 62 in order to provide a linear interpolation between two of the samples from the analog to digital convertor 27 of the receiver 24. The interpolation operation indicated at block 64 provides an output sample rate that is actually higher than the input rate of the analog to digital convertor 27. As such, a high oversampling rate is not required by the analog to digital convertor 27 of the receiver 24. Only 19.2 kHz samples (6 samples per 3200 baud symbol) for example need to be stored in the buffer 56.

After interpolation, the resulting signal on line 66 is multiplied at block 68 by the gain correction value output from the gain update section 52 on line 70. Thereafter, at block 72 the DC correction value output on line 74 from the DC update section 54 is subtracted from the signal output from block 68 in order to provide a corrected signal on line 76 that is used by a symbol decoder 77 for making symbol decisions. In particular, the corrected signal is applied to a decision block 78 of the decoder 77 that makes either two-level or four-level decisions.

Figure 4:
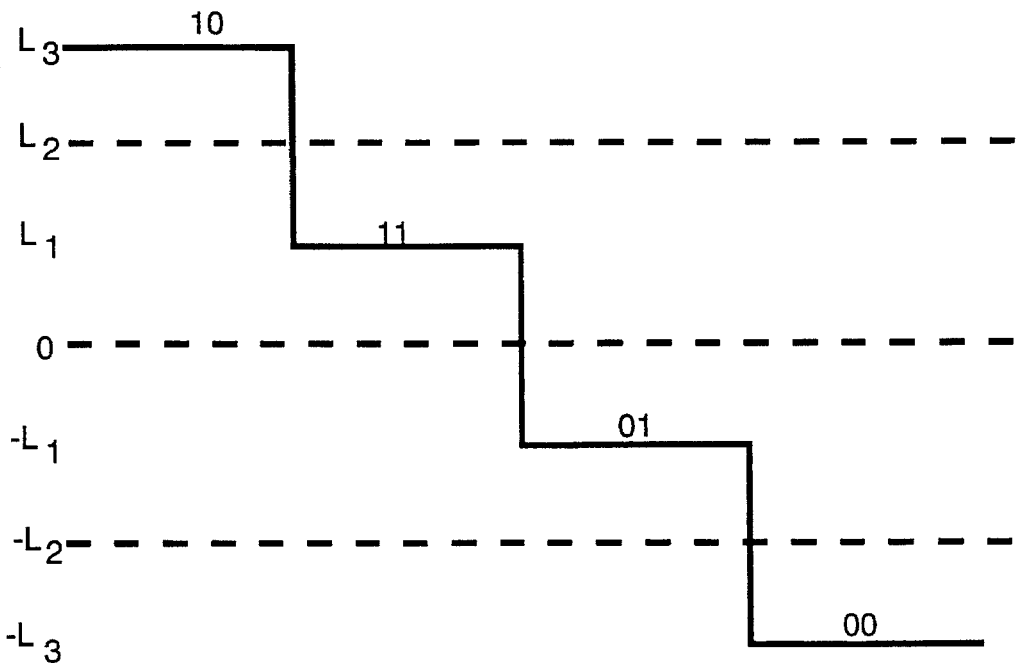
FIG. 4 illustrates a four-level signal and associated symbols depicted with respect to the various symbol detection threshold levels that are derived in accordance with the present invention.

A four-level signal is depicted in FIG. 4. The decision block 78 decodes a four-level signal utilizing threshold values $L_3$, $L_2$, and $L_1$ as well as $-L_1$, $-L_2$, and $-L_3$ in order to decode the received signal into symbols such as the symbol 10, the symbol 11, the symbol 01 or the symbol 00. The symbol decision block 78 compares the corrected signal 76 to the various threshold levels to determine what symbol the corrected signal represents. For example, a corrected signal that is less than the threshold level $L_2$ and greater than zero will be decoded by the symbol decision block as the symbol 11.

The corrected signal is also compared by the symbol decoder 77 at a block 80 to the nominal signal level associated with the symbol decision, the nominal signal level being for example, $L_3$, $L_2$ or $L_1$. The difference between the corrected signal and the nominal signal level or threshold level utilized for the symbol decision represents a feedback error that is output from block 80 on a line 82. The feedback error output on line 82 is applied to a limiter at block 84 that limits the feedback error to within an allowable range such as $-L_3$ to $+L_3$ so as to prevent wild excursions in the feedback error. The feedback error output from the limiter 84 is applied to the timing update section 50.

The timing update section 50 is responsive to the feedback error and to the sign of the difference as determined at block 88 between the current sample output from the buffer 56 and the previous sample output from the sample delay block 60. The difference value output from block 88 represents the slope of the received signal and is applied to a block 90 of the timing update section 50 that determines the sign of the slope input thereto. The sign of the slope is multiplied at a block 92 by the feedback error input to the timing update section 50 to provide at the output of block 92 on line 94 a measure of the timing phase error. A positive slope in conjunction with a positive feedback error results in a positive timing phase error on line 94. Similarly, a negative slope in conjunction with negative feedback error results in a positive timing phase error on line 94. This is opposed to a negative slope in conjunction with a positive feedback error or a positive slope in conjunction with a negative feedback error both of which will result in negative timing phase errors. The timing phase error on line 94 is multiplied by a clock loop feedback constant $C_{ck}$ at block 96. The timing phase error filtered by the feedback constant $C_{ck}$ is then subtracted at a block 98 from a previously stored timing phase value applied to block 98 on line 100 output from the storage block 102. The resulting difference becomes the new timing phase error which is output on line 103 to control the time at which the buffer 56 is sampled. If the timing phase error is measured to be positive during a given symbol interval, the loop will sample the eye at an earlier point when detecting the next symbol. Similarly, if the timing phase error is measured to be negative during a given symbol interval, the loop will sample the eye at a later point when detecting the next symbol. This synchronizing operation minimizes feedback error and is thus a maximum-eye-opening synchronizer. It is noted that the interpolation factor τ represents the decimal portion of the timing phase error output on line 103. For example, if the timing phase error is 2.9, then τ is 0.9.

The gain update section 52 operates in a similar manner as the timing update section 50. In particular, a block 110 of the gain update section 52 determines the sign of the symbol level detected by block 78. For example, if the 00 symbol is detected, associated with the $-L_3$ level, then the sign determined at block 110 is the minus sign i.e. $-1$. A block 112 then multiplies the limited feedback error applied thereto from block 84 by the sign determined at block 110 to provide an output that is multiplied at block 114 by a gain feedback loop constant $C_g$. The gain error term scaled by the feedback loop constant $C_g$ output from block 114 is then subtracted at block 116 from the previously stored gain correction value or term to provide a new gain correction value that is stored at block 118 and applied on line 70 to block 68. At block 68 the interpolated signal sample is multiplied by the gain correction term.

In order to derive the DC offset correction value that is applied to block 72 on line 74, the feedback error output by the limiter 84 is applied to a second limiter 86. This second limiter limits the feedback error applied to the DC offset update section 54 to 10% of the nominal signal level $L_3$. This second limiter helps reduce fluctuations of the DC correction value caused by noise. The feedback error output from the limiter 86 is multiplied by a DC offset feedback loop constant at block 120, the output of which is added at a block 122 to the previously stored DC offset correction value. The sum output from block 122 becomes the new DC offset correction value that is stored at block 124 and also applied on line 74 to block 72 to correct the received signal prior to symbol decoding at block It is noted that during certain acquisition scenarios the stochastic gradient recovery system depicted in FIG. 2 can acquire a false lock. For example, if a positive frequency offset exists between the transmitter and the receiver during the comma portion of the sync 1 portion of a received signal as depicted in FIG. 3B, instead of correcting the DC term by lowering the waveform, the stochastic gradient recovery system of FIG. 2 could possibly raise the waveform and lock onto the symbol transitions. If this occurs, it is possible that a predetermined synchronization word such as the A word or the $\overline{A}$ word which is part of sync 1 shown in FIG. 3B will never be detected. Therefore, in accordance with the present invention, as depicted in FIGS. 5A–5C, prior to the detection of a predetermined synchronization word, such as the A word or $\overline{A}$ word, the DC offset update section 54 and the gain update section 52 of the symbol of the stochastic gradient symbol recovery system of FIG. 2 are not utilized. Instead, until the predetermined synchronization word is detected, a peak and valley routine is utilized to derive the DC offset correction term as well as the thresholds utilized for symbol decoding.

Figure 3A:
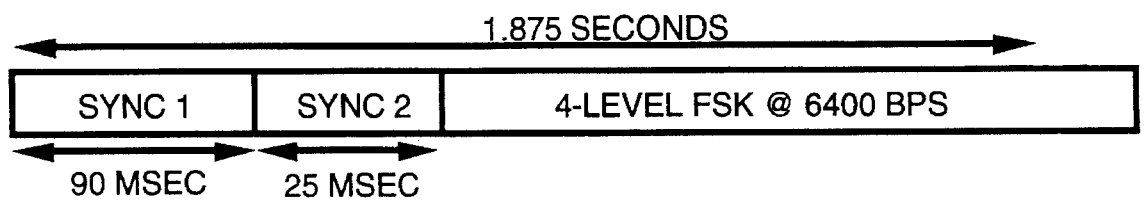
FIG. 3A illustrates the structure of a frame of information in accordance with the FLEX protocol.
Figure 3B:
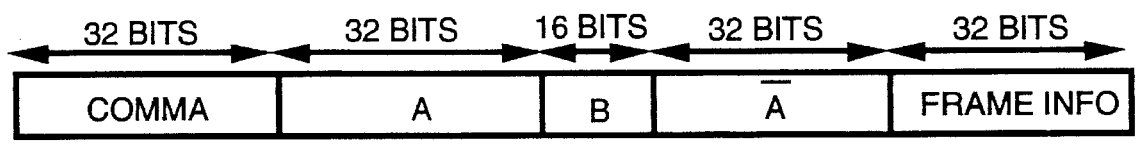
FIG. 3B illustrates the structure of the Sync 1 word of the FLEX protocol.

More particularly, if the protocol of the received signal is, for example, FLEX, the received signal will have the structure depicted in FIG. 3A. The Sync 1 portion of the signal is a two-level signal on which peak and valley routines work well because the data is fairly balanced. As shown in FIG. 3B, Sync 1 includes 32 bits forming a comma word followed by 32 bits forming a predetermined synchronization word referred to hereinafter as the A word. The A word is followed by 16 bits forming a word designated as the B word. Thereafter, Sync 1 includes 32 bits representing the inverse of the A word and referred to as the $\overline{A}$ word. The $\overline{A}$ word is thereafter followed by 32 bits of frame information. As shown in FIG. 3A, following Sync 1 in the FLEX frame is Sync 2 which is a four-level signal followed by the four-level message portion of the frame. Once the A word or the $\overline{A}$ word is detected, the stochastic gradient feedback loop is utilized to determine the DC offset correction value as well as the gain correction value that are used to correct a received signal prior to symbol decoding. Optimum synchronization acquisition and signal tracking are obtained from the combined peak and valley routine and stochastic gradient routine of the present invention without the problems of these routines when individually implemented.

Figure 5A:
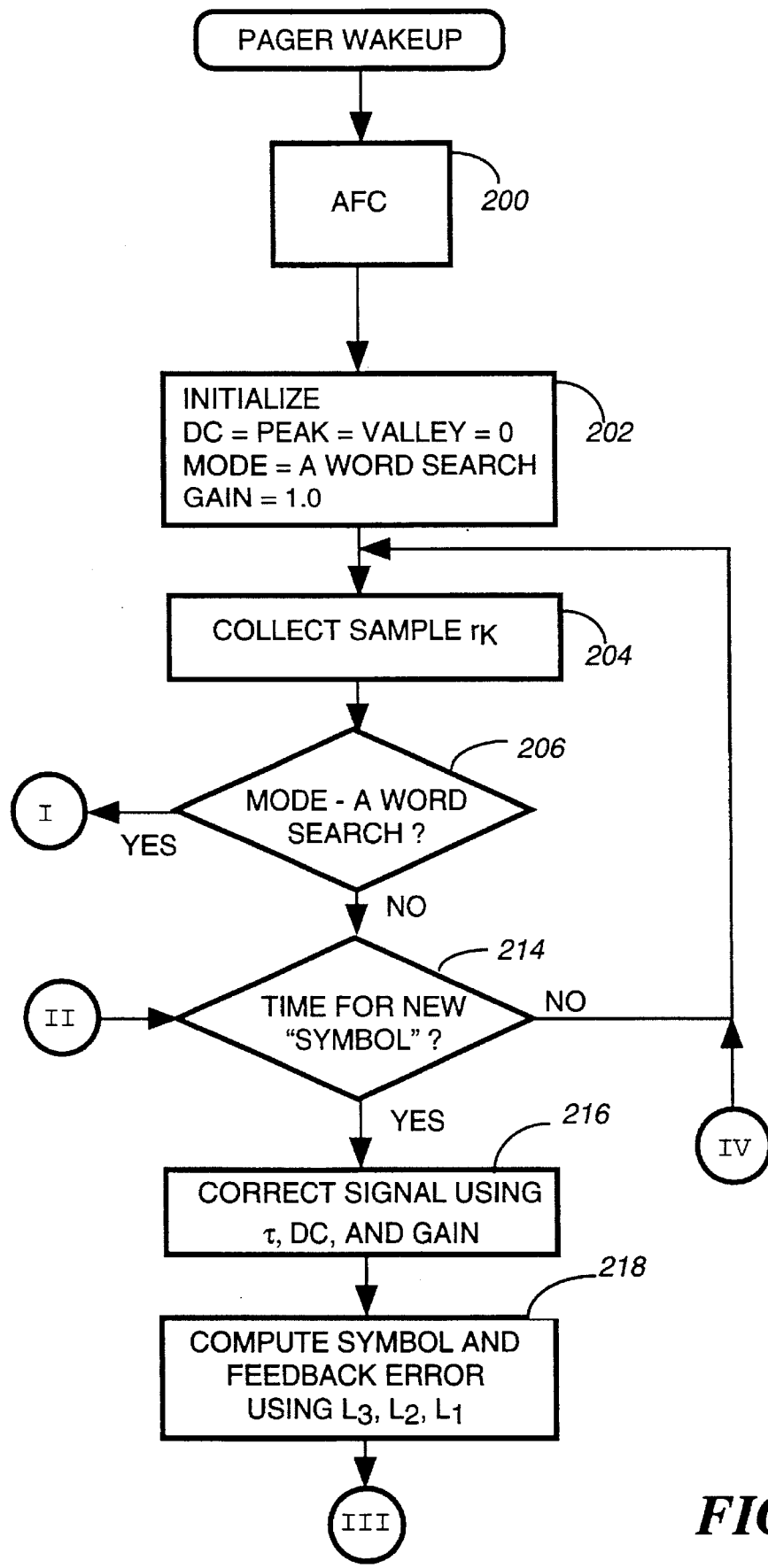
FIGS. 5A–5C form a flow chart illustrating the operation of the signal detector of the present invention combining peak and valley techniques and the stochastic gradient symbol recovery technique illustrated in FIG. 2.
Figure 5B:
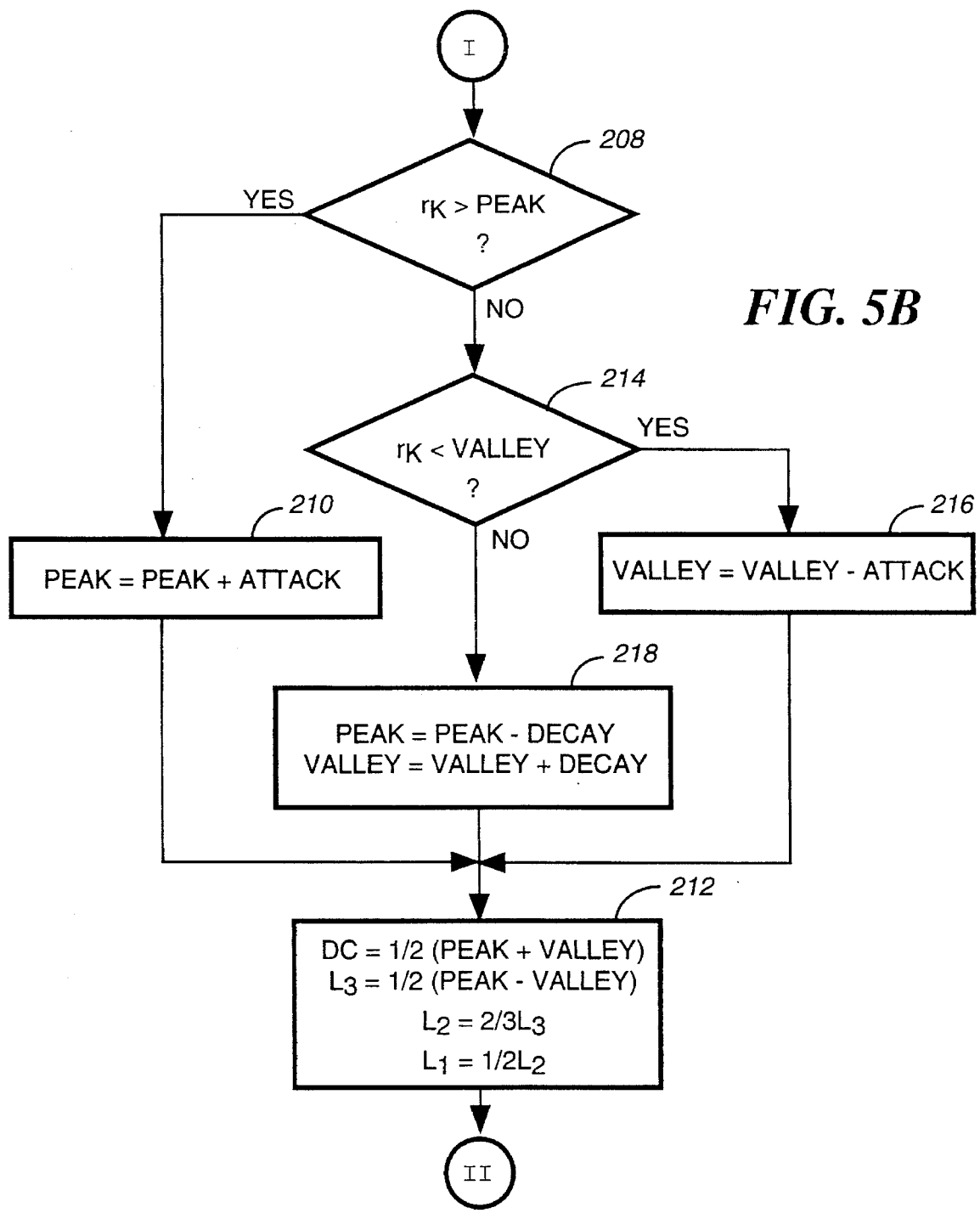
Figure 5C:
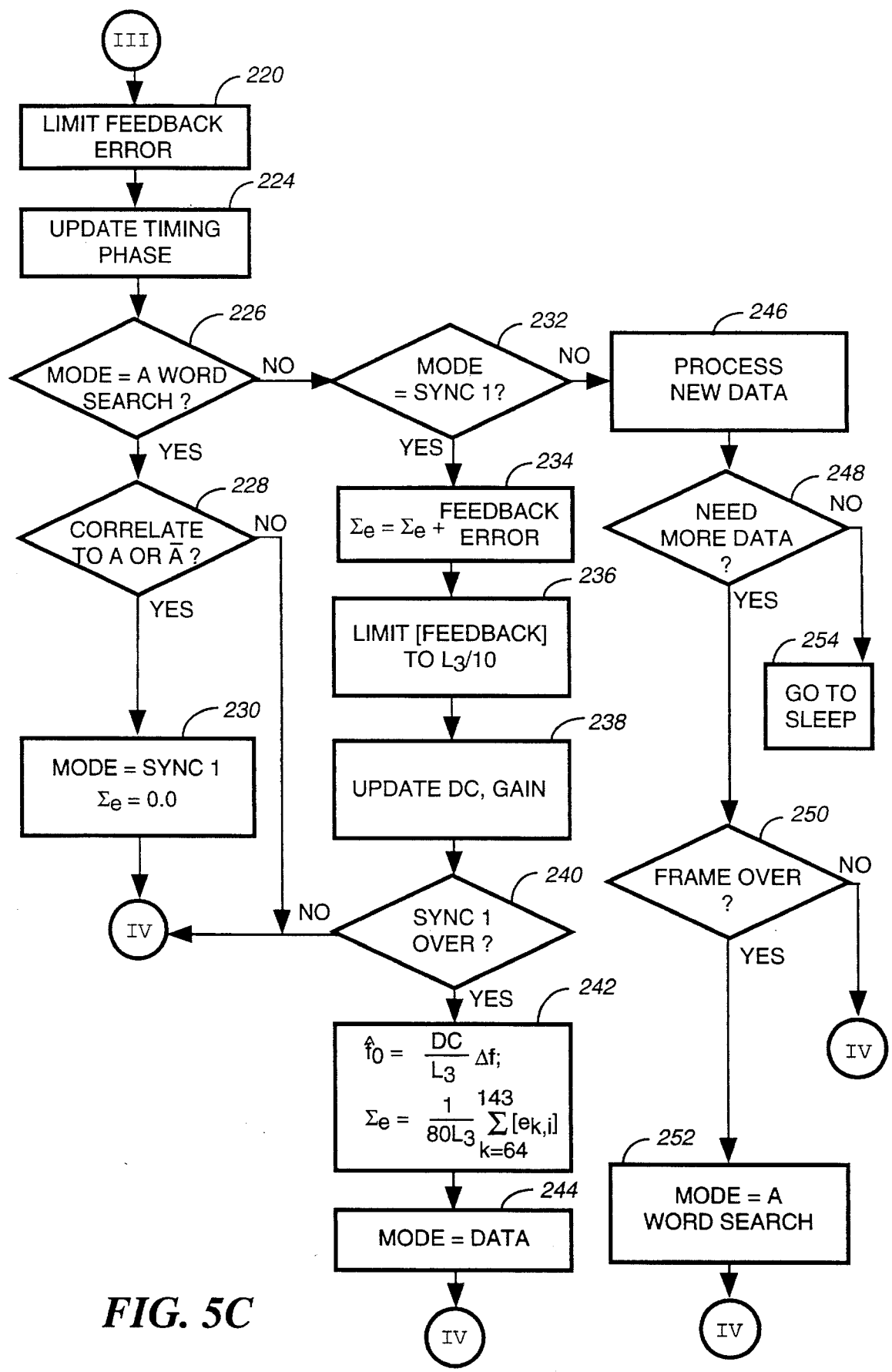

The operation of the combined peak and valley/stochastic gradient signal decoding scheme in accordance with the present invention is illustrated in FIGS. 5A–5C. As shown therein, upon wake up of the device 10, the central processing unit, hereinafter referred to as CPU 28, of the selective call receiving device 10 first executes an automatic frequency control routine described in detail below with respect to FIG. 6. Thereafter, at a block 202, the CPU 28 initializes the signal decoding scheme by setting the variables: DC, PEAK and VALLEY all equal to 0. At block 202 the CPU 28 also sets the mode equal to an A word search so that the CPU will begin searching the signal for the predetermined synchronization word A or $\overline{A}$. The gain value is also set equal to 1 at block 202. After initializing the routine at block 202, the CPU 28 proceeds to block 204 to collect a received signal sample $r_k$. Next, the CPU 28 determines at block 206 whether the mode of operation is an A word search. If the A word has not been detected, the mode of operation will be the A word search mode. In the A word search mode, the CPU 28 proceeds from block 206 to block 208 shown in FIG. 5B.

At block 208 the CPU 28 begins the implementation of a peak and valley routine depicted in FIG. 5B. More particularly, at block 208 the CPU 28 determines whether the sampled received signal is greater than the variable PEAK. If so, at block 210 the CPU 28 adds an ATTACK constant to the PEAK variable to form a new PEAK variable. The updated PEAK value is thereafter utilized by the CPU 28 at block 212 to determine a DC correction offset term and the thresholds or nominal signal level values $L_3$, $L_2$ and $L_1$ utilized for decoding a four-level signal. If the microprocessor determines at block 208 that the sampled received signal is less than the PEAK variable, the microprocessor proceeds from block 208 to a block 214. At block 214, the CPU 28 determines whether the sampled received signal $r_k$ is less than the variable VALLEY. If so, the CPU 28 proceeds to block 216 to decrement the variable VALLEY by the ATTACK constant to derive an updated VALLEY variable which is thereafter applied to block 212. If the sampled received signal $r_k$ is less than the PEAK variable and greater than the VALLEY variable as determined by the CPU 28 at blocks 208 and 214, the CPU 28 proceeds to block 218 from block 214. At block 218, the CPU 28 sets the PEAK variable equal to the last determined PEAK variable minus a DECAY constant. At block 218, the CPU 28 also sets the VALLEY variable equal to the last determined VALLEY variable plus the DECAY constant. Thereafter, the CPU 28 proceeds to block 212. At block 212, the CPU 28 updates the DC offset correction term by setting it equal to one half of the sum of the PEAK and VALLEY variables. At block 212, the CPU 28 sets the nominal signal level, associated with the uppermost threshold, $L_3$ equal to one-half of the difference between the PEAK and VALLEY variables. The threshold level $L_2$ is set by the CPU 28 at block 212 equal to two-thirds of the threshold $L_3$, whereas the threshold level $L_1$ is set equal to one-half of the threshold level $L_2$.

From block 212 of the PEAK and VALLEY routine depicted in FIG. 5B, the CPU 28 proceeds to block 214 shown in FIG. 214. At block 5A, the CPU 28 determines whether it is time to process a new interpolated signal sample. If so, the CPU 28 proceeds to block 216. Otherwise, the CPU 28 returns to block 204. At block 216, the CPU 28 utilizes the interpolation factor τ, derived from the timing update section of the stochastic gradient symbol recovery scheme shown in FIG. 2, to interpolate between two samples of the received signal. The CPU 28 also utilizes the DC correction value and the gain correction value to correct the received signal by multiplying the interpolated sample by the gain correction value and thereafter subtracting the DC correction value from the product. If the A word has not been found, to be discussed in details below the gain correction term used at block 216 will be equal to 1.0 and the DC correction term will be as determined at block 212 from the PEAK and VALLEY routine depicted in FIG. 5B. As discussed above with respect to FIG. 2, the CPU 28 at block 216 implements the operations of blocks 64, 68 and 72 of FIG. 2 utilizing the appropriate variables for the current mode. Thereafter, at block 218, the CPU 28 implements the symbol decoding decision block 70 as described above with respect to block 78 of FIG. 2 in order to decode the received signal sample into a symbol using the threshold values $L_3$, $L_2$ and $L_1$ determined by the PEAK and VALLEY routine of FIG. 5B. At block 218, the CPU 28 also determines the feedback error in accordance with the operation depicted in block 80 described above with respect to FIG. 2. From block 218, the CPU 28 proceeds to block 220 to limit the feedback error to plus or minus $L_3$ in order to execute the operation of block 84 of FIG. 2. Thereafter, the CPU 28 proceeds to block 224 to update the timing phase error by implementing the timing update section 50 of the stochastic recovery system depicted in FIG. 2.

After the timing phase error is updated at block 224, the CPU 28 at block 226 determines whether the mode of operation is still the A word search mode. If so, the CPU 28, at block 228, performs a bit wise correlation on the received signal as is well-known in the art to determine whether the signal correlates to the predetermined synchronization word A or $\overline{A}$. If the A word or $\overline{A}$ word is detected at block 228, the CPU 28 proceeds to block 230 to set the mode of operation equal to a Sync 1 mode and to initialize an accumulated feedback error variable $\Sigma_e$ to 0.0. From block 230, the CPU 28 proceeds back to block 204 to collect the next sample of the received signal for processing. If the CPU 28 determines at block 228 that the predetermined synchronization word A or $\overline{A}$ still has not been detected, the CPU 28 proceeds directly from block 228 to block 204 to continue the PEAK and VALLEY synchronization scheme until the A word or $\overline{A}$ word is detected.

If the CPU 28 determines at block 226 that the mode of operation is no longer the A word search, the CPU 28 proceeds to a block 232. At block 232, the CPU 28 determines whether the mode of operation is the Sync 1 mode. If so, the CPU 28 proceeds to block 234 to set the accumulated feedback error variable $\Sigma_e$ equal to $\Sigma_e$ plus the feedback error value determined at block 218. Thereafter, at a block 236, the CPU 28 limits the absolute value of the feedback error to 10% of the threshold $L_3$ determined at block 212. The CPU 28 next updates at block 238 the DC offset correction value and the gain correction value by implementing the DC offset update section 54 and the gain update section 52 of the stochastic gradient symbol recovery scheme depicted in FIG. 2. The CPU 28 continues to accumulate the feedback error at block 234 and to make symbol decoding decisions based upon the timing update section 50, gain update section 52 and DC offset update section 54 of the stochastic gradient symbol recovery scheme during the remainder of Sync 1. When the CPU 28 determines at block 240 that Sync 1 is over, the CPU 28 proceeds to block 242 to calculate a frequency offset measurement $\hat{f}_0$ which is based on the DC correction value, DC, resulting from the PEAK and VALLEY routine at block 212 and updated in the stochastic gradient recovery scheme at block 238. Specifically, this frequency offset measurement is described by the following equation:

$\hat{f}_0 = DC \cdot \Delta f_{peak}/L_3$ where DC is the updated DC correction value at the end of the Sync 1 portion of a given frame, $\Delta f_{peak}$ is the peak deviation and $L_3$ is the nominal threshold value described above with respect to block 212 of the PEAK and VALLEY routine of FIG. 5B. At block 242, the CPU 28 further calculates a metric $\Sigma_{e,i}$ which represents the quality of the signals and $e_{ki}$ (of block 242 of FIG. 5C) is the feed back error for the kth symbol of frame i. In particular, this metric represents the feedback error accumulated during Sync 1 after the detection of the A word or $\overline{A}$ word. This metric will be large if the feedback error is large indicating that the received signal is noisy. The variables calculated at block 242 by the CPU 28 are utilized as discussed below in the automatic frequency control routine depicted in FIG. 6.

From block 242, the CPU 28 proceeds to block 244 to set the mode equal to a data mode. Thereafter, the received signals are processed by the CPU 28 in accordance with well-known techniques at block 246 for processing the received data that was previously collected. After processing the received data at block 246, the CPU 28 will determine if more data is needed at a block 248. If so, the microprocessor determines whether a frame as depicted in FIG. 3A is over at block 250. If the frame is not over, the CPU 28 will proceed back to block 204 to collect the next sample of the received signal. If the frame is over and the CPU 28 needs more data, the CPU 28 will set the mode back to the A word search mode at block 252 so as to repeat the PEAK and VALLEY routine of FIG. 5B until the A word contained in the next frame of information is found, the CPU 28 thereafter proceeding with the stochastic gradient recovery scheme for the remainder of Sync 1 as described above. If the CPU 28 determines that no more data is needed, the CPU 28 will cause the selective call receiving device 10 to go to sleep at block 254.

Figure 6:
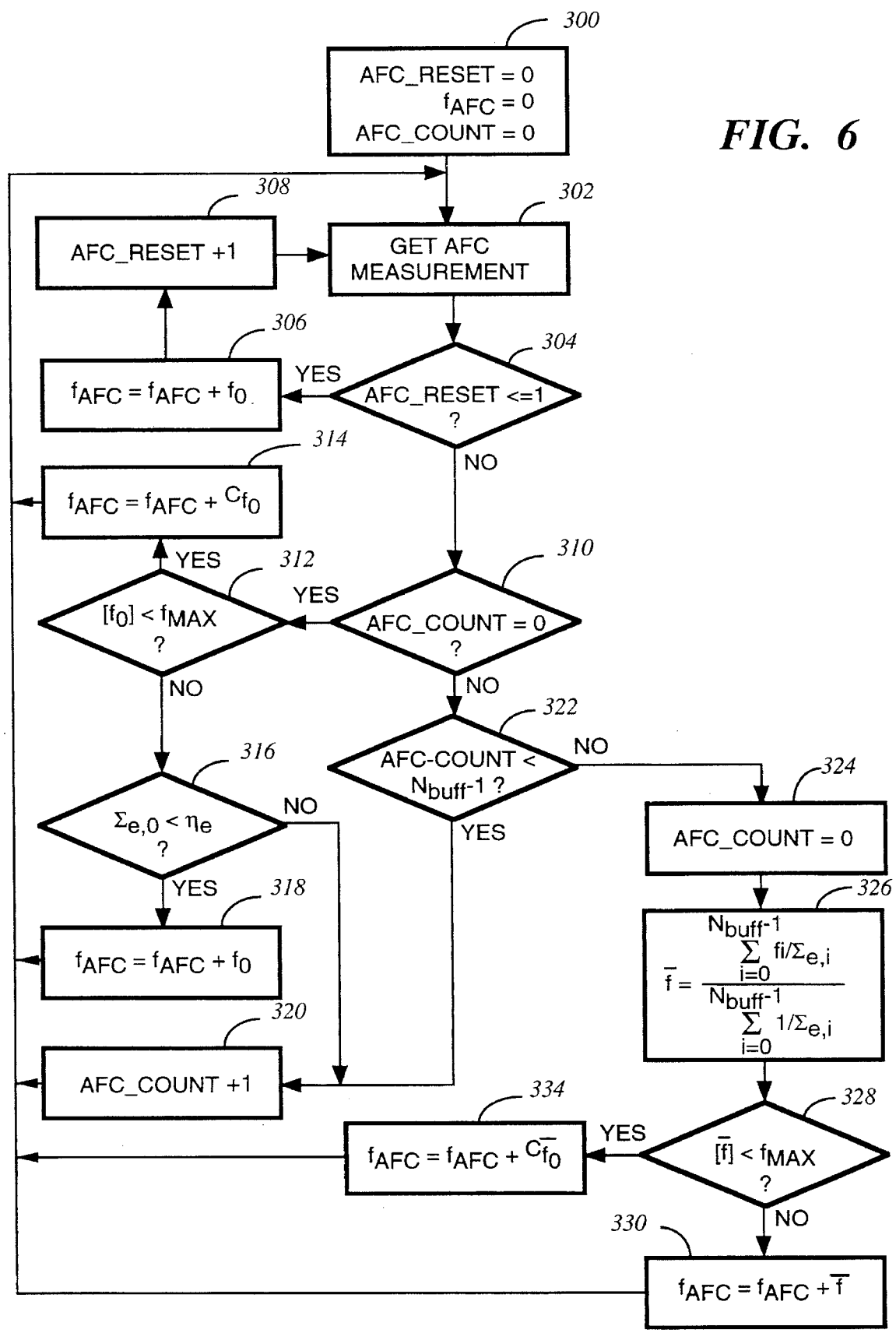
FIG. 6 is a flow chart illustrating an automatic frequency control routine in accordance with the present invention.

The automatic frequency control signal generating scheme in accordance with the present invention as depicted in FIG. 6 utilizes the frequency offset measurement and the signal quality metric determined at block 242 each of which is based respectively on the DC offset correction value and the accumulated feedback error that are derived from the stochastic gradient recovery scheme described above with respect to FIG. 2 and FIGS. 5A–5C.

The automatic frequency control of signal $f_{AFC}$ generated by the routing of FIG. 6, is coupled by the CPU 28 to the receiver's demodulator 25, which is an FM demodulator, to control the demodulation of the received signal. Upon entering the routine as depicted in FIG. 6, the CPU 28 at a block 300 initializes the routine by setting the variables, AFC RESET, $f_{AFC}$ and AFC COUNT all equal to 0. After initializing the routine, the CPU 28 proceeds to a block 302 to obtain the AFC measurement or frequency offset $\hat{f}_0$ calculated at block 242. Thereafter, the CPU 28 determines at a block 304 whether the variable AFC RESET is less than or equal to 1.0. If it is, as occurs at the beginning of the routine, the CPU 28 proceeds to block 306 to increment the variable $f_{AFC}$ by the frequency offset $\hat{f}_0$. Thereafter, the CPU 28 proceeds to block 308 where the CPU 28 increments the variable AFC RESET by 1.

When the CPU 28 determines that the variable AFC RESET is greater than 1 at block 304, the CPU 28 proceeds to block 310 to determine whether the variable AFC COUNT is equal to 0. If it is equal to 0, the CPU 28 proceeds to block 312. At block 312, the CPU 28 determines whether the absolute value of the frequency offset $\hat{f}_0$ is less than a reference value, $f_{MAX}$. If SO, the CPU determines that the frequency offset $\hat{f}_0$ is within tolerance and proceeds to block 314. At block 314 the variable $f_{AFC}$ is incremented by the frequency offset value, $\hat{f}_0$, scaled by a small constant C. This small constant, C, may be on the order of 0.05 for example. The filtering of the frequency offset by the constant C allows slight adjustments in the frequency control signal $f_{AFC}$ to be made when the frequency offset value $\hat{f}_0$ is determined to be within tolerance at block 312.

If the CPU 28 determines at block 312 that the absolute value of the frequency offset, $\hat{f}_0$ is greater than the reference value $f_{MAX}$ and thus not within tolerance, the CPU 28 proceeds from block 312 to block 316. At block 316, the CPU 28 compares the signal quality metric $\Sigma_{e,o}$ to a threshold value, $\eta_e$, to determine whether the signal quality metric indicates that the signal is too noisy. If the CPU 28 determines at block 316 that the signal is not too noisy, the variable $f_{AFC}$ is incremented by the value of the frequency offset $\hat{f}_0$ directly, without filtering, at a block 318 so as to provide fast tracking in the presence of a strong signal. If, however, the CPU 28 determines at block 316 that the signal quality metric indicates that the signal is too noisy, the CPU 28 proceeds from block 316 to block 320 at which the variable AFC COUNT is incremented by 1. At block 320 the CPU 28 also stores the frequency offset measurements so that a number of measurements equal to $N_{buff}$ are acquired, $N_{buff}$ representing the length of two buffers.

If the CPU determines at block 310 that the variable AFC COUNT is not equal to 0 and further determines at block 322 that the AFC COUNT is less than the variable $N_{buff}$ minus 1, the CPU 28 proceeds back to block 320 to increment the variable AFC COUNT and to store the values $\Sigma_e$ and $\hat{f}_0$ for later use. When the microprocessor at block 322 determines that enough frequency offset measurements have been obtained, the CPU 28 proceeds from block 322 to block 324 where the CPU resets the variable AFC COUNT to 0. Thereafter, at block 326, the CPU 28 calculates a weighted average value based on the stored frequency offset values $\hat{f}_i$ where the average frequency offset is weighted inversely proportionally to the signal quality metric. Specifically, the CPU 28 at block 326 calculates the weighted average frequency offset value $\bar{f}$ as follows:

$$\bar{f} = \frac{\sum_{i=0}^{N_{buff}-1} \hat{f}_i/\Sigma_{e,i}}{\sum_{i=0}^{N_{buff}-1} f_i/\Sigma_{e,i}}$$

After calculating the weighted frequency offset, the CPU at block 328 determines whether the absolute value thereof is less than the reference value $f_{MAX}$ to determine if it is within tolerance. If it is within tolerance, the CPU 28 proceeds to block 334. At block 334 the CPU 28 increments the frequency control signal $f_{AFC}$ by the weighted average frequency offset $\bar{f}$ scaled by a constant C for filtering the weighted average frequency offset. If the CPU 28 determines that the weighted average frequency offset is not within tolerance, the CPU 28 proceeds from the block 328 to a block 330 to increment the automatic frequency control signal by the weighted average frequency offset value directly so as to make an immediate adjustment without filtering. The automatic frequency control signal $f_{AFC}$ is thereafter applied by the CPU 28 to the receiver 24 for use by the demodulator 25.

The signal decoding obtained by the combination of a PEAK and VALLEY routine and a stochastic gradient symbol recovery routine in accordance with the present invention as described above provides optimum signal decoding. Further, the feedback error and DC correction term obtained from this type of symbol decoding can be used to derive an automatic frequency control signal that is both fast and accurate. Many modifications and variations of the present invention are possible in light of the above teachings. Thus, it is to be understood that, within the scope of the appended claims, the invention may be practiced otherwise than as described hereinabove.

What is claimed is:

1. In a selective call receiving device, a decoder for decoding a signal received by the device, said signal representing a plurality of symbols and at least one group of said symbols forming a predetermined synchronization word, said signal decoder comprising:

a symbol decoder for decoding symbols from a received signal utilizing at least one correction value to correct said received signal, said symbol decoder generating a feedback error associated with a decoded symbol;

a synchronization word detector for detecting said predetermined synchronization word in said received signal;

a peak and valley detector operable prior to the detection of said predetermined synchronization word for determining a peak value and a valley values in response to said received signal and for determining one of said correction value from said peak and valley values;

a feedback loop operable after the detection of said predetermined synchronization word for determining one of said correction value in response to said feedback error; and a frequency offset generator for generating a frequency offset value from one of said correction values, this correction value being a DC offset correction value determined in response to said feedback error at the end of a predetermined portion of the received signal.

2. A selective call receiving device as recited in claim 1 wherein said peak and valley detector sets said one correction value to approximately one-half of the sum of the peak and valley values.

3. A selective call receiving device as recited in claim 1 including means for determining at least one threshold value to be used by said symbol decoder for discriminating between symbols, said threshold being determined from said peak and valley values.

4. A selective call receiving device as reclined in claim 3 wherein said symbol decoder is responsive to the difference between said threshold value and a corrected received signal to generate said feedback error.

5. A selective call receiving device as recited in claim 4 including a feedback error limiter for comparing said difference between said threshold value and said corrected received signal to a limit and setting said feedback error to said limit if the absolute value of said difference exceeds said limit.

6. A selective call receiving device as recited in claim 1 wherein said feedback loop includes:

means for storing a previous correction value;

means for scaling said feedback error by a constant; and means for determining the sum of said previous correction value and said scaled feedback error to generate an updated correction value.

7. A selective call receiving device as recited in claim 1 having a demodulator, said device further including:

an accumulator for accumulating said feedback error over a predetermined portion of said received signal after the detection of said predetermined synchronization word to provide a signal quality value representing the quality of a received signal; and an automatic frequency control signal generator for generating a frequency control signal for said demodulator in response to said frequency offset value and said signal quality value.

8. A selective call receiving device as recited in claim 7 further including:

means for comparing the absolute value of said frequency offset to a frequency offset reference value to determine if the absolute value of said frequency offset is greater than said frequency offset reference value;

means responsive to a determination that said frequency offset is greater than said frequency offset reference value for comparing said signal quality value to a signal quality reference value to determine if said signal quality value is greater than said signal quality reference value; and means responsive to a determination that said signal quality value is greater than said signal quality reference value for generating an average frequency offset value weighted inversely proportionally with said signal quality value, said automatic frequency control signal generator generating a frequency control signal from said weighted average frequency offset value.

9. A selective call receiving device as recited in claim 8 including means responsive to a determination that said absolute value of said frequency offset is not greater than said frequency offset reference value for scaling said frequency offset by a constant, said automatic frequency control signal generator generating said automatic frequency control signal from said scaled frequency offset.

10. A selective call receiving device as recited in claim 8 including means responsive to a determination that the absolute value of said frequency offset is greater than said frequency offset reference value and that said signal quality value is not greater than said signal quality reference value for generating said frequency control signal directly from said frequency offset.

11. A selective call receiving device as recited in claim 8 including:

means for comparing the absolute value of said weighted average frequency offset value to said frequency offset reference value to determine whether said frequency offset reference value is greater than said weighted average frequency offset value; and means responsive to a determination that said frequency offset reference value is greater than the absolute value of said weighted average frequency offset for scaling said weighted average frequency offset by a constant, said frequency control signal generator generating said frequency control signal from said scaled, weighted average frequency offset.

12. A selective call receiving device as recited in claim 11 including means responsive to a determination that said frequency offset reference value is not greater than the absolute value of said weighted average frequency offset reference value for generating said frequency control signal directly from said weighted average frequency offset.

13. In a selective call receiving device, a decoder for decoding a signal received by the device, said signal representing a plurality of symbols and at least one group of said symbols forming a predetermined synchronization word, said signal decoder comprising:

a symbol decoder for decoding symbols from a received signal utilizing a plurality of correction values to correct said received signal prior to decoding, said symbol decoder generating a feedback error associated with a decoded symbol;

a synchronization word detector for detecting said predetermined synchronization word in said received signal;

a peak and valley detector operable prior to the detection of said predetermined synchronization word for determining a peak value and a valley value in response to said received signal and for determining at least one of said correction values from said peak and valley values as a threshold value, said peak and valley detector sets a second threshold value to approximately two-thirds of said threshold value and sets a third threshold value to approximately one-half of said threshold value; and a feedback loop operable after the detection of said predetermined synchronization word for updating said plurality of correction values in response to said feedback error, said symbol decoder utilizing said updated correction values for correcting said received signal prior to decoding.

14. A selective call receiving device as recited in claim 13 including means for determining at least one threshold value to be used by said symbol decoder for discriminating between symbols, said threshold value being determined from said peak and valley values.

15. A selective call receiving device as recited in claim 14 wherein said one correction value is a DC offset value and the peak and valley detector sets said DC offset value to approximately one-half of the sum of the peak and valley values.

16. A selective call receiving device as recited in claim 14 wherein said peak and valley detector sets said one threshold value to approximately one-half of the difference between the peak and valley values.

17. A selective call receiving device as recited in claim 14 wherein said symbol decoder is responsive to the difference between said threshold value and a corrected received signal to generate said feedback error.

18. A selective call receiving device as recited in claim 17 including a feedback error limiter for comparing said difference between said threshold value and said corrected received signal to a limit and setting said feedback error to said limit if the absolute value of said difference exceeds said limit.

19. A selective call receiving device as recited in claim 13 wherein said one correction value is a DC offset value and another of said plurality of correction values is a gain correction value.

20. A selective call receiving device as recited in claim 19 wherein said feedback loop for updating said DC offset value includes means for storing a previous correction value;

means for scaling said feedback error by a constant; and means for determining the sum of said previous correction value and said scaled feedback error to generate an updated correction value.

21. A selective call receiving device as recited in claim 19 wherein said feedback loop for updating said gain correction value includes:

means for determining a sign of a decoded symbol;

means for multiplying the sign of said decoded symbol by said feedback error to provide product;

means for scaling said product by a constant;

means for storing a previous gain correction value; and means for determining the difference between said previous gain correction value and said scaled feedback error to generate an updated gain correction value.

22. A selective call receiving device as recited in claim 13 having a demodulator and wherein said one correction value is a DC offset value, said device further including:

an accumulator for accumulating said feedback error over a predetermined portion of said received signal after the detection of said predetermined synchronization word to provide a signal quality value representing the quality of a received signal;

a frequency offset generator for generating a frequency offset value from the DC offset value determined at the end of said predetermined portion of said received signal; and an automatic frequency control signal generator for generating a frequency control signal for said demodulator in response to said frequency offset value and said signal quality value.

23. A selective call receiving device as recited in claim 22 further including:

means for comparing the absolute value of said frequency offset to a frequency offset reference value to determine if the absolute value of said frequency offset is greater than said frequency offset reference value;

means responsive to a determination that said frequency offset is greater than said frequency offset reference value for comparing said signal quality value to a signal quality reference value to determine if said signal quality value is greater than said signal quality reference value; and means responsive to a determination that said signal quality value is greater than said signal quality reference value for generating an average frequency offset value weighted inversely proportionally with said signal quality value, said automatic frequency control signal generator generating a frequency control signal from said weighted average frequency offset value.

24. A selective call receiving device as recited in claim 23 including means responsive to a determination that said absolute value of said frequency offset is not greater than said frequency offset reference value for scaling said frequency offset by a constant, said automatic frequency control signal generator generating said automatic frequency control signal from said scaled frequency offset.

25. A selective call receiving device as recited in claim 23 including means responsive to a determination that the absolute value of said frequency offset is greater than said frequency offset reference value and that said signal quality value is not greater than said signal quality reference value for generating said frequency control signal directly from said frequency offset.

26. A selective call receiving device as recited in claim 23 including:

means for comparing the absolute value of said weighted average frequency offset value to said frequency offset reference value to determine whether said frequency offset reference value is greater than said weighted average frequency offset value; and means responsive to a determination that said frequency offset reference value is greater than the absolute value of said weighted average frequency offset reference value for scaling said weighted average frequency offset by a constant, said frequency control signal generator generating said frequency control signal from said scaled, weighted average frequency offset.

27. A selective call receiving device as recited in claim 26 including means responsive to a determination that said frequency offset reference value is not greater than the absolute value of said weighted average frequency offset reference value for generating said frequency control signal directly from said weighted average frequency offset.

28. In a selective call receiving device, a decoder for decoding a signal received by the device, said signal representing a plurality of symbols and at least one group of said symbols forming a predetermined synchronization word, said signal decoder comprising:

means for sampling a received signal at a sampling time to provide a received signal sample;

a symbol decoder for decoding symbols from a received signal sample utilizing a plurality of correction values to correct said received signal prior to decoding, said symbol decoder generating a feedback error associated with a decoded symbol;

a sample time adjustment loop responsive to said feedback error for adjusting said sampling time;

a synchronization word detector for detecting said predetermined synchronization word in said received signal sample;

a peak and valley detector operable prior to the detection of said predetermined synchronization word for determining a peak value and a valley value in response to said received signal sample and for determining at least one of said correction values from said peak and valley values as a threshold value, said peak and valley detector sets a second threshold value to approximately two-thirds of said threshold value and sets a third threshold value to approximately one-half of said threshold value; and a feedback loop operable after the detection of said predetermined synchronization word for updating said plurality of correction values in response to said feedback error, said symbol decoder utilizing said updated correction values for correcting said received signal sample prior to decoding.

29. A selective call receiving device as recited in claim 28 wherein said one correction value is a DC offset value and another of said plurality of correction values is a gain correction value.

30. A selective call receiving device as recited in claim 29 wherein said feedback loop for updating said DC offset value includes means for storing a previous correction value;

means for scaling said feedback error by a constant; and means for determining the sum of said previous correction value and said scaled feedback error to generate an updated correction value.

31. A selective call receiving device as recited in claim 29 wherein said feedback loop for updating said gain correction value includes:

means for determining the sign of a decoded symbol;

means for multiplying the sign of said decoded symbol by said feedback error to provide product;

means for scaling said product by a constant to provide a scaled error;

means for storing a previous gain correction value; and means for determining the difference between said previous gain correction value and said scaled error to generate an updated gain correction value.

32. A selective call receiving device as recited in claim 28 wherein said sample time adjustment loop includes:

means for determining the slope of said received signal;

means for determining the sign of said slope;

means for multiplying the sign of said slope by said feedback error to provide a product;

means for scaling said product by a constant to provide a scaled error;

means for storing a previous timing value; and means for determining the difference between said previous timing value and said scaled error to generate an updated timing value for adjusting said sampling time.

33. A selective call receiving device as recited in claim 32 further including means for interpolating between received signal samples in response to at least a portion of said updated timing value.

34. A method of decoding a signal received by a selective call receiving device, said signal representing a plurality of symbols and at least one group of said symbols forming a predetermined synchronization word said method comprising:

detecting the magnitude of a peak and a valley of said received signal to provide respective peak and valley values;

generating a correction value forming a threshold value and also generating two additional threshold values, the first being set to approximately two-thirds of said threshold value and the second being set to approximately half of said threshold value;

correcting said received signal with said correction value to provide a corrected received signal;

decoding said corrected received signal into a symbol based on said threshold values;

generating a feedback error representing the difference between said received corrected signal and one of said threshold values;

detecting said predetermined synchronization word in said received corrected signal; and updating said correction value based upon said feedback error in response to the detection of said predetermined synchronization word.

35. A method of decoding a signal received by a selective call receiving device, said signal representing a plurality of symbols and at least one group of said symbols forming a predetermined synchronization word said method comprising:

detecting the magnitude of a peak and a valley of said received signal to provide respective peak and valley values;

generating at least one correction value and three threshold values from said peak and valley values;

correcting said received signal with at least one correction value;

decoding said corrected received signal into a symbol based on at least one of said threshold values;

generating a feedback error representing the difference between said corrected received signal and said one threshold value;

detecting said predetermined synchronization word in said received signal;

updating said one correction value based upon said feedback error and a first constant in response to the detection of said predetermined synchronization word; and generating a second correction value for said received signal based upon said feedback error and a second constant in response to the detection of said predetermined synchronization word, said updated one correction value and said second correction value being utilized to correct said received signal prior to decoding said signal into a symbol.

36. A selective call receiving device receiving a signal representing a plurality of symbols subsequent to a detection of a predetermined synchronization word, comprising:

a symbol decoder for decoding symbols from a received signal utilizing at least one correction value to correct said received signal, said symbol decoder generating a feedback error associated with a decoded symbol;

a feedback loop for determining said one correction value in response to said feedback error;

an accumulator for accumulating said feedback error over a predetermined portion of said received signal after the detection of said predetermined synchronization word to provide a signal quality value representing the quality of a received signal;

a frequency offset generator for generating a frequency offset value from said correction value determined at the end of said predetermined portion of said received signal; and an automatic frequency control signal generator for generating a frequency control signal in response to said frequency offset value and said signal quality value.

37. A selective call receiving device as recited in claim 36 further including:

means for comparing the absolute value of said frequency offset value to a frequency offset reference value to determine if the absolute value of said frequency offset is greater than said frequency offset reference value;

means responsive to a determination that said frequency offset is greater than said frequency offset reference value for comparing said signal quality value to a signal quality reference value to determine if said signal quality value is greater than said signal quality reference value; and means responsive to a determination that said signal quality value is greater than said signal quality reference value for generating an average frequency offset value weighted inversely proportionally with said signal quality value, said automatic frequency control signal generator generating a frequency control signal from said weighted average frequency offset value.

38. A selective call receiving device as recited in claim 37 including means responsive to a determination that said absolute value of said frequency offset is not greater than said frequency offset reference value for scaling said frequency control signal generator generating said automatic frequency control signal from said scaled frequency offset.

39. A selective call receiving device as recited in claim 37 including means responsive to a determination that the absolute value of said frequency offset is greater than said frequency offset reference value and that said signal quality value is not greater than said signal quality reference value for generating said frequency control signal directly from said frequency offset.

40. A selective call receiving device as recited in claim 37 including:

means for comparing the absolute value of said weighted average frequency offset value to said frequency offset reference value to determine whether said frequency offset reference value is greater than said weighted average frequency offset value; and means responsive to a determination that said frequency offset reference value is greater than the absolute value of said weighted average frequency offset for scaling said weighted average frequency offset by a constant, said frequency control signal generator generating said frequency control signal from said scaled, weighted average frequency offset.

41. A selective call receiving device as recited in claim 40 including means responsive to a determination that said frequency offset reference value is not greater than the absolute value of said weighted average frequency offset reference value for generating said frequency control signal directly from said weighted average frequency offset.

42. A method of processing a signal received by a selective call receiving device, said signal representing a plurality of symbols, said method comprising:

correcting a received signal with at least one correction value;

decoding said corrected received signal into a symbol based on a threshold value;

generating a feedback error representing the to difference between said corrected received signal and said threshold value;

updating said one correction value based on said feedback error;

accumulating said feedback error over a predetermined portion of said received signal to provide a signal quality value representing the quality of a received signal;

generating a frequency offset value from said one correction value determined at the end of said predetermined portion of said received signal; and generating an automatic frequency control signal in response to said frequency offset value and said signal quality value.

43. A method of processing a signal received by a selective call receiving device as recited in claim 42 further including:

comparing the absolute value of said frequency offset to a frequency offset reference value to determine if the absolute value of said frequency offset is greater than said frequency offset reference value;

comparing, in response to a determination that said frequency offset is greater than said frequency offset reference value, said signal quality value to a signal quality reference value to determine if said signal quality value is greater than said signal quality reference value; and generating, in response to a determination that said signal quality value is greater than said signal quality reference value, an average frequency offset value weighted inversely proportionally with said signal quality value, said automatic frequency control signal being generated from said weighted average frequency offset value.

* * * * *

UNITED STATES PATENT AND TRADEMARK OFFICE
CERTIFICATE OF CORRECTION

PATENT NO. : 5,566,213
DATED : October 15, 1996
INVENTOR(S) : Carsello

It is certified that error appears in the above-indentified patent and that said Letters Patent is hereby corrected as shown below:

Claim 1, Column 11, Line 22, after the word valley, change "values" to --value--.

Claim 4, Column 11, Line 43, change "reclined" to --recited--.

Claim 42, Column 18, Line 21, delete "tō".

Signed and Sealed this

Seventh Day of January, 1997

Attest:

BRUCE LEHMAN

*Attesting Officer*  *Commissioner of Patents and Trademarks*